United States Patent [19]

Dixon

[11] Patent Number: 5,063,566
[45] Date of Patent: Nov. 5, 1991

[54] INTERNALLY-DOUBLED, COMPOSITE-CAVITY MICROLASER

[75] Inventor: George J. Dixon, Orlando, Fla.

[73] Assignee: Amoco Corporation, Chicago, Ill.

[21] Appl. No.: 516,459

[22] Filed: Apr. 30, 1990

[51] Int. Cl.⁵ .............................................. H01S 3/10
[52] U.S. Cl. ........................................ 372/22; 372/41; 372/97; 372/106; 372/108; 359/328
[58] Field of Search ............... 372/21, 22, 92, 99, 372/98, 105, 106, 108, 75, 41, 66, 49, 97; 307/427

[56] References Cited

U.S. PATENT DOCUMENTS

| | | | |
|---|---|---|---|
| 4,731,795 | 3/1988 | Clark et al. | 372/107 |
| 4,739,507 | 4/1988 | Byer et al. | 372/22 |
| 4,791,631 | 12/1988 | Baumert et al. | 372/22 |
| 4,797,893 | 1/1989 | Dixon | 372/66 |
| 4,847,851 | 7/1989 | Dixon | 372/75 |
| 4,860,304 | 8/1989 | Mooradian | 372/92 |
| 4,910,740 | 3/1990 | Oka | 372/22 |
| 4,933,947 | 6/1990 | Anthon et al. | 372/34 |
| 4,953,166 | 8/1990 | Mooradian | 372/21 |

Primary Examiner—William L. Sikes
Assistant Examiner—Galen J. Hansen
Attorney, Agent, or Firm—James A. Gabala; William H. Magidson; Ralph C. Medhurst

[57] ABSTRACT

A microlaser is disclosed comprising: a gain medium having one face which is adapted be coupled to a source of optical pumping radiation and having an opposite face; harmonic conversion means having a close face which is located adjacent to and spaced apart from the opposite face of the gain medium and which is coated for high transmission at a fundamental and high reflectivity at a harmonic and having an opposite face which is coated for high transmission at the fundamental and some transmission at said harmonic; and polarization control means, located adjacent to and spaced apart from the opposite face of the harmonic conversion means, for controlling the polarization of the fundamental.

22 Claims, 1 Drawing Sheet

INTERNALLY-DOUBLED, COMPOSITE-CAVITY MICROLASER

TECHNICAL FIELD

This invention relates to the general subject of solid-state lasers and, in particular, to a laser-pumped microlaser for intracavity generation of a harmonic output.

BACKGROUND OF THE INVENTION

Microlasers are attractive because of their improved efficiency, reliability and smaller size. Philip E. Chumbley, "Microlasers offer New Reliability for R&D," *Research and Development*, June 1989, page 72. Chumbley has suggested that an intracavity crystal may be used to permit a microlaser, which ordinarily emits infrared light, to produce visible light and that Brewster plates can be added inside the cavity to provide a polarized output with minimal loss in intensity. Unfortunately, the microlaser illustrated by Chumbley is relatively large in size and makes use of an intracavity lens between the gain medium and the doubling crystal.

In U.S. Pat. No. 4,847,851 G. J. Dixon disclosed a compact, diode-pumped, solid-state laser wherein the diode pump is butt-coupled to a laser gain material which absorbs 63% of the optical pumping radiation within a pathlength of less than 500 microns. In such a device, a divergent beam of optical pumping radiation from the diode pump is directed into a volume of the gain medium which has a sufficiently small transverse cross-sectional area so as to support only single transverse mode laser operation. Optical lenses are not needed for coupling.

J. J. Zayhowski and A. Mooradian, "Single-frequency Microchip Nd Lases," *Optics Letters*, Vol. 14, No. 1, pp. 24–26 (Jan. 1, 1989), have reported the construction of single-frequency microchip lasers: which use a miniature, monolithic, flat-flat, solid-state cavity (e.g., 730 micron long cavity) whose mode spacing is greater than the gain bandwidth of the gain medium; and which are longitudinally pumped with the close-coupled, unfocused output of a laser diode. Moordadian has also disclosed in U.S. Pat. No. 4,860,304 a microlaser employing a gain medium made from a stoichiometric laser material, such as Nd pentaphosphate, and having a cavity length in the range of 10 to 100 microns.

The conversion of optical radiation at one frequency into optical radiation of another frequency by interaction with a nonlinear optical material within an optical cavity is disclosed in a patent application by D. W. Anthon and D. L. Sipes entitled "Frequency Conversion of Optical Radiation" which was filed on 5/18/89 under Ser. No. 353,870 and which has matured into U.S. Pat. No. 4,933,947.

A diode pumped laser having a harmonic generator is disclosed by Robert Byer, G. J. Dixon and T. J. Kane in U.S. Pat. No. 4,739,507 and in an article by Byer. "Diode Laser-Pumped Solid-State Lasers," Science, Vol. 239, Feb. 12, 1988, page 745. Unfortunately, the structure disclosed by Byer is also relatively large in that lenses and/or curved mirrors are employed.

What is needed is a method and apparatus which achieves harmonic conversion in a solid-state laser resonator, which does not require curved mirrors or lenses and which has the advantages of small size, efficient lasing in a close-coupled pump geometry and ease of assembly. Such a microlaser will not only have wide applications in the production of (visible light) but also will be easy to manufacture on a mass production scale, thereby lowering costs and leading to even more practical uses.

SUMMARY OF THE INVENTION

One object of the invention is to provide an internally-doubled, composite-cavity microlaser.

Another object is to provide a microlaser having all flat parts which can be close coupled to a laser diode pump source without having to use coupling optics.

Still another object is to provide a novel spacer technology to preserve the parallelism of etalon surfaces of a microlaser while separating the coatings on individual pieces.

Yet another object of the invention is to provide a efficient microlaser which uses a stoichiometric gain medium and emits output radiation which is a harmonic of that produced by the gain medium.

Another object of the invention is to provide an easy to build microlaser which is fabricated from platelets which have a thickness of less than a millimeter.

In accordance with the present invention, disclosure is made of a microlaser which comprises: a gain medium having one face which is adapted to be close coupled to a source of optical pumping radiation and having an opposite emitting face; harmonic conversion means having a close face which is located adjacent to the emitting face of the gain medium and which has high transmission at a fundamental wavelength and high reflectivity at a harmonic wavelength and having an opposite face which has high transmission at the fundamental wavelength and some transmission at the harmonic wavelength; and phase control means, located adjacent to the opposite face of the harmonic conversion means, for maximizing harmonic conversion and emitting optical radiation at the harmonic wavelength.

In one preferred particular embodiment, the microlaser comprises a sub-millimeter thickness of a crystal of a stoichiometric neodymium laser material which has plane parallel faces polished to etalon tolerances a sub-millimeter thickness of potassium titanyl phosphate ("KTP"), and a quarter-waveplate. Dielectric coatings are applied directly to the polished faces to form the laser resonator and a harmonic sub-resonator. The microlaser is capable of significant single longitudinal mode output power and can be pumped by affixing it to the submount of laser diode array (i.e., close-coupled pumping geometry). Some of the major advantages are: the sub-millimeter size, the fact that it lases efficiently in a close-coupled pump geometry, the absence of mode-hopping noise, design and fabrication simplicity, and the mass production potential of a design which uses planar components. In addition, the longitudinal mode spectrum is easy to control; in other words, longitudinal mode competition noise is absent.

Numerous other advantages and features of the present invention will become readily apparent from the following detailed description of the invention, the embodiment described therein, from the claims, and from the accompanying drawings.

DETAILED DESCRIPTION

Figure 1:
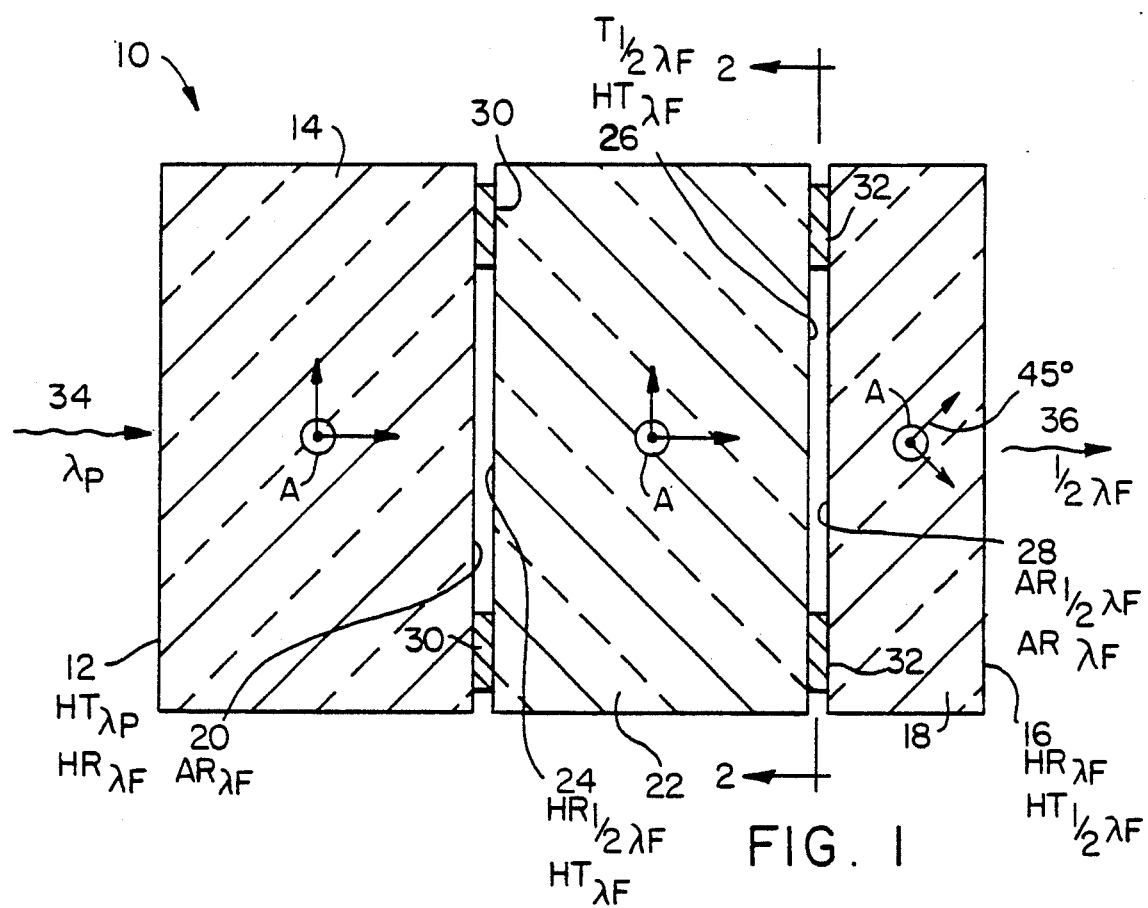
FIG. 1 is a side, cross sectional view of the microlaser that is the subject of the present invention.

While this invention is susceptible of embodiment in many different forms, there is shown in the drawings and will herein be described in detail one specific embodiment of the invention. It should be understood, however, that the present disclosure is to be considered an exemplification of the principles of the invention and is not intended to limit the invention to the specific embodiment illustrated.

A schematic representation of a composite-cavity, intracavity-doubled, microlaser 10 is shown in FIG. 1. The microlaser 10 comprises three generally rectangular platelets: a gain medium 14; a harmonic crystal 22; and phase control means 18.

The gain medium 14 is optionally pumped or excited by a variety of sources, including light-emitting diodes (as used herein, this term includes superluminescent diodes and superluminescent diode arrays) and laser diodes (as used herein, the term includes laser diode arrays). Such sources are well known and available to those skilled in the art. For example, the use of one or more light-emitting semiconductor diodes to end pump a neodymium-doped YAG rod is disclosed in U.S. Pat. No. 3,753,145 which is herein incorporated by reference. The use of an array of pulsed laser diodes to end pump a solid lasant material, such as neodymium-doped YAG is described in U.S. Pat. No. 3,982,201 which is herein incorporated by reference. A laser diode is preferred as a pumping source, in that its use results in a compact, easy to assemble design.

Lasant materials commonly used in such solid state lasers include crystalline or glassy host materials into which an active material, such as trivalent neodymium ions, is incorporated. Highly suitable solid lasant materials include substances wherein the active material is a stoichiometric component of the lasant material (e.g., neodymium aluminum borate or NAB) as well as $Y_3Al_5O_{12}$ or "YAG", $YLiF_4$ or "YLF" and $YVO_4$ which have been doped with a rare earth (e.g., Nd, Tm, Eb, etc.). Such stoichiometric materials include, for example, neodymium pentaphosphate, lithium neodymium tetraphosphate ("LNP"), and potassium neodymium tetraphosphate ("KNP"). Detailed summaries of conventional solid lasant materials are set forth in *CRC Handbook of Laser Science and Technology*, Vol. I, M. J. Weber, Ed., CRC Press, Inc., Boca Raton, Fla., 1982, pp. 72-135 and by A. A. Kaminskii in *Laser Crystals*, Vol. 14 of the Springer Series in Optical Sciences, D. L. MacAdam, Ed., Springer-Verlag, New York, N.Y., 1981.

The cavity of the laser 10 is formed by the outer surface 12 of the gain medium 14 and the outer face 16 of the quarter-wave plate 18. The outer or pumping face 12 of the gain medium 14 is preferably coated for high reflectivity at the wavelength of the fundamental which is produced by lasing the gain medium (e.g., 1064 nm where a gain medium of NAB is used) and high transmission at the pump wavelength (e.g., 800 nm when an Argon-ion, laser-pumped Ti:Sapphire pump is used as a pumping source for NAB). The inner surface 20 of the gain medium 14 is antireflection-coated for the fundamental. The two surfaces 12 and 20 of the gain medium 14 are polished flat and parallel to etalon tolerances (e.g., typical parallelism better than 2 arc-seconds). Those skilled in the art will appreciate that it is easier to evenly polish a flat surface than it is to polish a curved surface. One advantage of using sub-millimeter thickness platelets is the relative ease at which they can be made in quantity and assembled together. This is especially advantageous when the invention is made in quantity.

The harmonic crystal 22 may also be in the form of a rectangular platelet. Preferably it is of sub-millimeter thickness and polished to etalon tolerances. The face 24 of the crystal 22 which closest to the gain medium 14 is coated for high transmission (i.e., greater than 90%) at the fundamental and high reflectivity at the harmonic (e.g., the second harmonic at 532 nm, when NAB is used as the gain medium). The opposite face 26 is coated for high transmission at the fundamental and for some transmission (typically 1% to 20%) at the harmonic. The harmonic crystal 22 forms a sub-resonator within the laser cavity for producing a harmonic output.

Materials suitable for use as a harmonic crystal 22 are those which have nonlinear optical properties. For example, U.S. Pat. No. 3,949,323 issued to Bierlein et al. on Apr. 6, 1976, discloses that nonlinear optical properties are possessed by materials having the formula $MTiO(XO_4)$ where "M" is at least one of the elements K, Rb, Tl and NH4; and "X" is at least one of the elements P or As, except when NH4 is present, then "X" is only P. This generic formula includes potassium titanyl phosphate (KTP), $KTiOPO_4$, a particularly useful nonlinear material. The application of KTP to electro-optic devices, particularly in second-harmonic generation, is disclosed in U.S. Pat. Nos. 4,231,838 and 4,305,778. Other known nonlinear optical materials include, but are not limited to, $KH_2PO_4$ or KDP, $LiNbO_3$, $KNbO_3$, $\beta$-$BaB_2O_4$ or BBO, $Ba_2NaNb_5O_{15}$, $LiIO_3$, $HIO_3$, $KB_5O_8.4H_2O$, potassium lithium niobate, urea and organic non-linear materials. A review of the nonlinear optical properties of a number of different uniaxial crystals has been published in *Sov. J. Quantum Electron.*, Vol. 7, No: 1, January, 1977, pp. 1-13. Nonlinear optical materials have also been reviewed by S. Singh in the *CRC Handbook of Laser Science and Technology*, Vol. III, M. J. Weber, Ed., CRC Press, Inc., Boca Raton, Fla., 1986, pp. 3-228. Generally speaking, the more useful materials have phase matchable non-linear coefficients. In such materials the crystal symmetry provides for a large effective non-linearity (i.e., the nonlinear tensor components are large).

The conversion of optical radiation of one frequency to optical radiation of another frequency through interaction with a nonlinear optical material is a well-known concept and has been extensively studied. Examples of such conversion include harmonic generation, optical mixing and parametric oscillation. Second-harmonic generation or "frequency doubling" is perhaps the most common and important example of nonlinear optics. Basically, part of the energy of an optical wave of angular frequency $\omega$ propagating through a nonlinear optical crystal is converted to energy of a wave of angular frequency $2\omega$. Second-harmonic generation has been reviewed by A. Yariv in *Quantum Electronics*, Second Ed., John Wiley & Sons, New York, 1975 at pages 407-434 and by W. Koechner in *Solid State Laser Engineering*, Springer-Verlag, New York, 1976 at pages 491-524.

The effect of harmonic resonance on doubling efficiency is also well-known and has been described in numerous references (for example, "Optical Harmonic Generators and Optical Frequency Multipliers," by S.

A. Akhmanov, A. I. Kovrygin and A. P. Sukhorukox in *Quantum Electronics Volume 1, Part B*, H. Rabin and C. L. Tang, Ed., Academic Press, New York, 1975). For a symmetric resonator with harmonic reflectivity, R, on the two mirrors, the harmonic conversion efficiency for a given nonlinear crystal is increased by a factor of 1/(1-R) compared to the non-resonant case. For optimal Gaussian focusing, this has the same effect as increasing the length of the nonlinear crystal by 1/(1-R). The reflecting surfaces of the harmonic crystal 22 make it possible to achieve significant conversion to a harmonic while maintaining the small size of the laser.

The third component or phase control means 18 of the microlaser has the function of controlling both the phase of the returning fundamental and (in the special cases of an isotropic gain medium and/or Type II doubling) the polarization to assure maximum harmonic conversion. Type II phase matching is preferred for efficient frequency-doubling when using a harmonic crystal 22 having two axes of polarization (e.g., KTP). In such a case, a quarterwaveplate may be used as the phase control means. In other crystals, such as MgO:LiNbO$_3$, the only acceptable type of phase matching is Type I. In any case dispersion or bi-refringence in this component allows one to phase the fundamental and the harmonic correctly on the return trip to get maximum harmonic conversion.

When a quarter-waveplate 18 is used, it creates an intracavity field with equal powers along the two orthogonal axes of the harmonic crystal 22. The relative orientation of the gain crystal 14, the crystal 22, and the quarter-waveplate 18 are shown schematically by arrows in FIG. 1 relative to the axis A of the laser. The quarter-waveplate 18 has two opposite faces 16 and 28 which are also polished to etalon tolerances. The inside face 28 is preferably anti-reflection coated for both the harmonic and the fundamental. The outside face 16 forms an end of the optical cavity and is preferably coated for high reflectivity at the fundamental wavelength and high transmission at the harmonic wavelength.

Commonly used stoichiometric crystals (e.g., LNP, KNP, NAB, etc.) are all anisotropic in gain and will emit a polarized beam in the absence of other intracavity birefringement elements. By aligning the harmonic crystal 22 axes and stoichiometric gain crystal 14 axes (See arrows in FIG. 1) and by rotating the quarter-waveplate 18 axes at 45° with respect to them, eigenmodes are established which are located within the cavity and which have equal powers along the two orthogonal axes of the harmonic crystal 22. This assures optimal harmonic conversion of the intracavity field.

Figure 2:
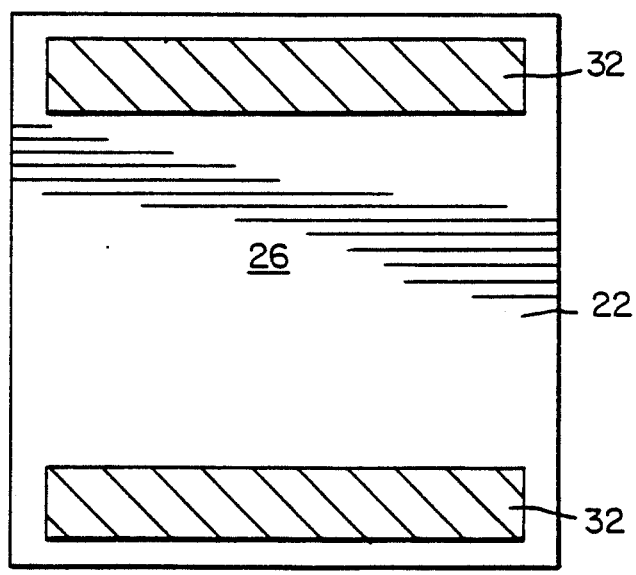
FIG. 2 is a cross sectional view of the laser of FIG. 1 as viewed along line 2—2.

Referring to FIG. 2, the harmonic crystal 22 has e-beam evaporated Al$_2$O$_3$ spacer "rails" 30 and 32 which are approximately 1 to 2 microns thick and which are located adjacent to the outside edges of the two parallel surfaces 24 and 26. These rails separate the coated surfaces of the individual platelets from one another while maintaining the alignment tolerances of the composite microlaser 10.

The microlaser 10 may be assembled by pressing the three platelets 14, 18 and 22 together after appropriate alignment of the axes. Parallelism of the two ends 12 and 16 of the composite cavity is guaranteed by the parallelism of the individual pieces and the fact that the rail spacers 30 and 32 preserve this parallelism while slightly separating the coated surfaces. The ease with which parallelism is maintained and the ease of assembly are two advantages that facilitate mass production of the invention.

EXAMPLES

A composite cavity microlaser which is an example of this invention has been built and tested. A 0.5 mm thick NAB etalon was used as a stoichiometric gain medium 14. A 0.5 mm thick KTP etalon was used as the harmonic crystal 22 and a 0.25 mm thick quarter-waveplate 18 was used. The faces of the NAB etalon was round; the others were square-shaped. If all square-shaped cross sections were used, the assembled microlaser would resemble a cube. Square faces are not required. What is essential is to have the axes of the crystals aligned properly.

The components were mounted between two plates, one copper and one plastic. Al$_2$O$_3$ spacer rails separated the three components. Four screws were used to hold the assembly together. The microlaser 10 was pumped by the output (see arrow 34 in FIG. 1) of an argon-ion, laser-pumped Ti:Sapphire laser (i.e., 800 nm pumping wavelength) which was imaged onto the pump or outside face 12 of the gain medium 14 by using a 25-mm focal length lens. An output power (see arrow 36) of 1 mW CW was observed at an input pump power (see arrow 34) of 140 mW. A maximum harmonic power of 8 mW was recorded at an input power of 375 mW. The output wavelength was 532 nm.

The harmonic output was found to be sensitive to overall cavity length. Although the gain medium 14 should operate at a wavelength which is exactly twice that of a resonant wavelength of the KTP, experiments have shown that a wider range of wavelengths would result in efficient harmonic conversion. This is believed to be due to the sub-millimeter thickness of the KTP. Further experiments will explain this phenomenon.

There was a slight tilt to the resonator mirrors and the easiest way to achieve the correct resonance condition was to translate the laser resonator 10 perpendicular to the pump. The power stability of the laser was good over periods of a few seconds but heating of the cavity components caused the fundamental laser output to drift out of resonance with the harmonic crystal etalon over periods of a few tens of seconds. The spatial mode was of high spatial quality under all conditions. Green rings were present around the main spot as would be expected due to the use of a nonlinear etalon, however they could not be detected visually about three feet from the laser cavity. They can be removed with an extracavity iris if desired. No significant noise peaks were found in the output up to 1 GHz. In addition, the output was substantially free of longitudinal mode competition noise.

The microlaser did have stability constraints due to the use of the harmonic resonance enhancement. The green output was found to fluctuate by only 10% over the course of half an hour which, considering that the pump source fluctuated by a few percent, is quite good. There were some pronounced thermal effects. The microlaser gave the most stable output when pumped near its edge where it was sitting in the copper mount, thereby heat sinking it quite effectively. The stability dropped off significantly near the center of the crystal. Nevertheless, thermal effects are minimized due to the small size. This is still another advantage of the invention.

Another preferred embodiment of the present invention is one which uses LNP as the gain medium 14, a 1047-cut KTP crystal 22, and a laser diode for pumping. Preferably, the composite laser resonator is close-coupled to the laser diode. End-pumping or butt-coupling of a diode laser to a laser cavity is described and illustrated in U.S. Pat. No. 4,847,851 which is herein incorporated by reference. The term "butt-coupling" means coupling which is sufficiently close (i.e., less than about 0.001 inches) such that the divergent beam of optical pumping radiation, which emanates from the output face 16 and which is essentially on the optic axis of the cavity, will optically pump a mode volume within the lasant material with sufficiently small traverse sectional area so as to support essentially only single traverse mode laser operation. A tightly focused semi-conductor laser diode array to end pump Nd:YAG (using 810 nm as the pumping wavelength) and to produce an output of 1064 nm has been disclosed by D. L. Sipes. (Appl. Phys. Letters, Vol. 47, No. 2, 1985, pp. 74) which is herein incorporated by reference. In one specific experiment, a close coupled laser diode was used.

For a 200 mW diode source, outputs between 2.0 mW and 2.5 mW were observed at 523 nm. Such a $C^4$ (Close-Coupled-Composite-Cavity) Cube Laser has the advantage of being small enough to be housed within the package of a conventional laser diode. Another advantage is that, because of the small size, thermal control would be facilitated over the cavity of the microlaser. Other schemes for effectively utilizing sub-resonators in the cavity of a diode-pumped microlaser will be apparent to those skilled in the art.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and separate features of the invention may be utilized. For example, the principle just described equally applies to difference-frequency generation, to sum-frequency generation and to optical parametric oscillators, both doubly and singly resonant. Resonant subcavities for various intracavity modulation schemes are also suggested. Moreover, both organic and inorganic frequency conversion materials are suggested. Thicknesses as short as one coherence length are also suggested. Finally, although all flat components are preferred for a variety of reasons (e.g., fabrication ease, etc.), a curved output coupler may be included without increasing the complexity of the invention by a large amount. Such a coupler may be used to increase conversion by concentrating the laser beam.

Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

We claim:

1. An intra cavity, frequency-doubling microlaser, comprising:
   a. a gain medium having one face which is adapted to be close coupled to a source of optical pumping radiation and which is highly reflective to laser transmitting laser light at said fundamental wavelength;
   b. harmonic conversion means having a close face which is located adjacent to said opposite face of said gain medium and which has high transmission of said fundamental wavelength and high reflectivity at a harmonic of said fundamental wavelength, and having an opposite face which has high transmission at said fundamental wavelength and more reflection than transmission at said harmonic; and
   c. control means, located adjacent to said opposite face of said harmonic conversion means, for adjusting the phase of said fundamental wavelength to maximize harmonic conversion for emitting optical radiation at said harmonic, and for reflecting laser light at said fundamental frequency.

2. A microlaser, comprising:
   a. a gain medium having one face which is adapted to be close coupled to a source of optical pumping radiation and which is highly reflective to laser light at a fundamental wavelength and having an opposite face for high transmission of laser light at said fundamental wavelength;
   b. harmonic conversion means having a close face which is located adjacent to said opposite face of said gain medium and which has high transmission at said fundamental wavelength and high reflectivity at a harmonic of said fundamental wavelength, and having an opposite parallel face which has high transmission at said fundamental wavelength and some transmission at said harmonic;
   c. control means, located adjacent to said opposite face of said harmonic conversion means, for adjusting the phase of said fundamental wavelength to maximize harmonic conversion, for emitting optical radiation at said harmonic, and for reflecting laser light at said fundamental frequency; and.
   d. coated spacer rail means, carried by at least one of said faces of said harmonic conversion means and said gain medium, for separating said harmonic conversion means from said gain medium, wherein said coated spacer rail means comprises at least one strip of evaporated $Al_2O_3$ for separating said harmonic conversion means from said gain medium.

3. The microlaser of claim 2, wherein said at least one face has two outside edges; and wherein said coated spacer rail means comprises two strips, each of said strips of $Al_2O_3$ being located adjacent to one of said two outside edges.

4. A microlaser, comprising:
   a. a gain medium having one face which is adapted to be close coupled to a source of optical pumping radiation and which is highly reflective to laser light at a fundamental wavelength and having an opposite face for high transmission of laser light at said fundamental wavelength;
   b. harmonic conversion means having a close face which is located adjacent to said opposite face of said gain medium and which has high transmission at said fundamental wavelength and high reflectivity at a harmonic of said fundamental wavelength, and having an opposite face which has high transmission at said fundamental wavelength and some transmission at said harmonic, said opposite face of said harmonic conversion means carrying coating means for achieving substantially more reflection than transmission at said harmonic; and
   c. control means, located adjacent to said opposite face of said harmonic conversion means, for adjusting the phase of said fundamental wavelength to maximize harmonic conversion, for emitting optical radiation at said harmonic, and for reflecting laser light at said fundamental frequency.

5. The microlaser of claim 4, wherein said gain medium comprises a sub-millimeter thickness of a stoichiometric crystal having parallel faces which are polished to etalon tolerances.

6. The microlaser of claim 5, wherein said source has a pumping wavelength; and wherein said one face has high reflectively at said fundamental wavelength and high transmission at said pumping wavelength of said source.

7. The microlaser of claim 4, wherein said source comprises semi-conductor light source means selected from the group consisting of laser diodes, laser diode arrays, superluminescent diodes and superluminescent diode arrays having a substantially monochromatic output.

8. The microlaser of claim 7, wherein said one face of said gain medium is close coupled to said semi-conductor light source means, and wherein said opposite face of said gain medium carries anti-reflection coating means for said fundamental wavelength.

9. The microlaser of claim 4, wherein the said close face and said opposite face of said harmonic conversion means are substantially parallel to each other.

10. The microlaser of claim 9, further including coated spacer rail means, carried by at least one of said faces of said harmonic conversion means and said gain medium, for separating said harmonic conversion means from said gain medium.

11. The microlaser of claim 4, wherein said close face carries coating means for achieving in excess of 90 percent transmission at said fundamental wavelength.

12. The microlaser of claim 4, wherein said harmonic conversion means comprises a sub-millimeter thickness of a nonlinear optical material.

13. The microlaser of claim 4, wherein said gain medium comprises a sub-millimeter thickness of a material selected from the group consisting of NAB, LNP, KNP, X:YAG, X:YLF and X:YVO$_4$ where X is a rare earth dopant.

14. The microlaser of claim 4, wherein said harmonic conversion means has two orthogonal axes of polarization; and wherein said gain medium has crystal axes which are aligned to said polarization axes of said harmonic conversion means.

15. The microlaser of claim 14, wherein said control means comprises a quarter-waveplate whose axes are at an acute angle relative to and in a plane generally parallel to said polarization axes.

16. A laser, comprising:
a. a sub-millimeter thickness of a lasant gain medium having two opposite and substantially parallel surfaces, said gain medium producing a lasant output in response to optical pumping and one of said surfaces being highly reflective;
b. harmonic sub-resonator means for harmonically converting the lasant output of said gain medium, said harmonic sub-resonator means comprising a submillimeter thickness of a no-linear optical crystal having two opposite and substantially parallel faces which carry coating means for harmonic resonance and having one face located adjacent to one of said two surfaces of said gain medium, said gain medium comprising a stoichiometric crystal whose axes are aligned to the polarization axes of said non-linear optical crystal;
c. phase control means, located adjacent to the other of said two faces of said harmonic sub-resonator means, for maximizing harmonic conversion and for reflecting light towards said one surface of said gain medium, said phase control means comprising a quarter-waveplate whose optical axes are aligned approximately 45 degrees to a plane containing said aligned polarization axes of said stoichiometric crystal and said non-linear optical crystal; and
d. preserving means, coated on at least one of said phase control means and said harmonic sub-resonator means, for preserving the parallelism of said one surface and said one face and separating said one surface from said one face, said preserving means comprises strips of evaporated material coated on each of said faces of said harmonic sub-resonator means.

17. A frequency doubled microlaser which is adapted to be pumped by and close-coupled to laser diode means, comprising:
a sub-millimeter thickness of a solid gain medium having two opposite coated surfaces of which one surface provides high reflectivity at a first predetermined wavelength and high transmission at a pumping wavelength and of which the opposite surface is anti-reflection coated for said first predetermined wavelength;
a sub-millimeter thickness of non-linear optical crystal means having a close face which is located adjacent to said opposite surface of said gain medium and which is coated for high transmission at said first predetermined wavelength and high reflectivity at a second predetermined wavelength which is a harmonic of said first predetermined wavelength and having an opposite face which is coated for high transmission at said first predetermined wavelength and for substantially more reflection than transmission at said second predetermined wavelength, said close face and said opposite face of said non-linear optical crystal means being substantially parallel to one another;
quarter-waveplate means having one surface which is located adjacent to said opposite face of said non-linear optical crystal means and which is antireflection coated at said first predetermined wavelength and said second predetermined wavelength and having an opposite surface which is coated for high reflectivity at said first predetermined wavelength and high transmission at said second predetermined wavelength; and
means for preserving the parallelism of said coated surfaces and coated faces and for separating said coated surfaces and coated faces, said means for preserving the parallelism of said coated surfaces and coated faces and separating said coated surfaces and coated faces comprising a plurality of evaporated metal oxide strips which are carried by at least one of said adjacent coated surfaces and coated faces of said gain medium and said optical crystal means and carried by at least one of said adjacent coated surfaces and coated faces of said optical crystal means and said quarter-waveplate means.

18. A microlaser, comprising:
a. an anisotropic gain medium having one face which is adapted to be close coupled to a source of optical pumping radiation and which is highly reflective to laser light at a fundamental wavelength, and having an opposite face for emitting laser light at said fundamental wavelength;

b. harmonic conversion means, comprising a nonlinear crystal which phase matches for Type I harmonic generation, having a close face which is located adjacent to said opposite face of said gain medium and which has high transmission at said fundamental wavelength and high reflectivity at a harmonic of said fundamental wavelength, and having an opposite face which has high transmission at said fundamental wavelength and some transmission at said harmonic of said fundamental wavelength, and having two axes of polarization which are aligned to the principal directions of said anisotropic gain medium; and c. phase adjustment means, located adjacent to said opposite face of said harmonic conversion means, for adjusting the phase of said fundamental wavelength to maximize harmonic conversion and for highly reflecting laser light at said fundamental frequency.

19. The microlaser of claim 18, wherein said phase adjustment means is a birefringent material having axes of which are aligned to said principal directions of said anisotropic gain medium.

20. A microlaser, comprising:

a. a gain medium having one face which is adapted to be close coupled to a source of optical pumping radiation and which is highly reflective to laser light at a fundamental wavelength and having an opposite face for emitting laser light at said fundamental wavelength;

b. a nonlinear crystal which phase matches for Type II harmonic generation, having a close face which is located adjacent to said opposite face of said gain medium and which has high transmission at said fundamental wavelength and high reflectivity at a harmonic of said fundamental wavelength, and having an opposite face which has high transmission at said fundamental wavelength and some transmission at said harmonic; and c. birefringent means, located adjacent to said opposite face of said nonlinear crystal and having optical axes at about 45 degrees to axes of said gain medium and axes of said nonlinear crystal, for emitting optical radiation at said harmonic, for fixing the polarization of light to achieve optimal Type II harmonic generation, and for reflecting laser light at said fundamental frequency.

21. The microlaser of claim 2, wherein said $Al_2O_3$-strip is evaporatively applied by using an e-beam.

22. A microlaser, comprising:

a. a gain medium having one face which is adapted to be close coupled to a source of optical pumping radiation and which is highly reflective to laser light at a fundamental wavelength and having an opposite face for emitting laser light at said fundamental wavelength;

b. harmonic conversion means having a close face which is located adjacent to said opposite face of said gain medium and which has high transmission at said fundamental wavelength and high reflectivity at a harmonic of said fundamental wavelength, and having an opposite parallel face which has high transmission at said fundamental wavelength and some transmission at said harmonic;

c. control means, located adjacent to said opposite face of said harmonic conversion means, for adjusting the phase of said fundamental wavelength to amximize harmonic conversion, for emitting optical radiation at said harmonic, and for reflecting laser light at said fundamental frequency; and d. coated spacer rail means, carried by at least one of said faces of said harmonic conversion means and said gain medium, for separating said harmonic conversion means from said gain medium, said coated spacer rail means comprising at least one strip of an evaporated metal oxide.

* * * * *

UNITED STATES PATENT OFFICE
CERTIFICATE OF CORRECTION

Patent No. 5,063,566            Dated November 5, 1991

Inventor(s) George Jefferies Dixon

It is certified that error appears in the above-identified patent and that said Letters Patent is hereby corrected as shown below:

| Col. | Line | |
|---|---|---|
| 1 | 60 | "Scienc, Vol. 239" should read --Science, Vol. 239,-- |
| 4 | 25-26 | "NH4" should read --$NH_4$-- |
| 4 | 28 | "KTiOPO4" should read $KTiOPO_4$-- |
| 5 | 1 | "A.P. Sukhorukox" should read --A.P. Sukhorukov-- |
| 5 | 33 | "axis A" should read --axis "A"-- |
| 7 | 21 | "...laser diode was used. For a 200 mW..." should read --...laser diode was used. For a 200 mW...-- |
| 7 | 64 | "reflective to laser transmitting..." should read --reflective to laser light at a fundamental wavelength and having an opposite face for substantially transmitting--. |
| 9 | 9 | "high reflectively" should read --high reflectivity-- |
| 9 | 61 | "no-linear" to read --non-linear--. |
| 12 | 31 | "amximize" should read --maximize-- |

Signed and Sealed this
Twenty-seventh Day of April, 1993

Attest:

MICHAEL K. KIRK

*Attesting Officer*      *Acting Commissioner of Patents and Trademarks*